United States Patent
Lim

(10) Patent No.: US 12,438,384 B2
(45) Date of Patent: Oct. 7, 2025

(54) CELL STABILIZING METHOD AND SYSTEM OF ENERGY STORAGE SYSTEM (ESS)

(71) Applicant: LG ENERGY SOLUTION, LTD., Seoul (KR)

(72) Inventor: Bo Mi Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 888 days.

(21) Appl. No.: 17/637,344

(22) PCT Filed: Jul. 1, 2020

(86) PCT No.: PCT/KR2020/008589
§ 371 (c)(1),
(2) Date: Feb. 22, 2022

(87) PCT Pub. No.: WO2021/040217
PCT Pub. Date: Mar. 4, 2021

(65) Prior Publication Data
US 2022/0311255 A1   Sep. 29, 2022

(30) Foreign Application Priority Data

Aug. 23, 2019 (KR) .................. 10-2019-0103486

(51) Int. Cl.
*H02J 7/00* (2006.01)
*H01M 10/44* (2006.01)
*H01M 10/46* (2006.01)

(52) U.S. Cl.
CPC ......... *H02J 7/0048* (2020.01); *H01M 10/441* (2013.01); *H01M 10/46* (2013.01);
(Continued)

(58) Field of Classification Search
CPC ............. H02J 7/007182; H02J 7/00712; H02J 7/00714; H02J 7/0048; H02J 7/0063;
(Continued)

(56) References Cited

U.S. PATENT DOCUMENTS 7,755,331 B2   7/2010  Kawahara et al.
8,330,421 B2  12/2012  Nakanishi
(Continued)

FOREIGN PATENT DOCUMENTS

JP     2005-117722 A   4/2005
JP        4433752 B2   3/2010
(Continued)

OTHER PUBLICATIONS

Extended European Search Report for European Application No. 20857233.9, dated Sep. 1, 2022.
(Continued)

*Primary Examiner* — David V Henze-Gongola
(74) *Attorney, Agent, or Firm* — Birch, Stewart, Kolasch & Birch, LLP

(57) ABSTRACT

A method and a system for stabilizing battery cells of an energy storage system (ESS) to enable uniform charge/discharge without the generation of a state of charge (SOC) deviation among the battery cells by charging/discharging the plurality of battery cells included in a battery rack differently by module unit to minimize the deterioration and impact caused by intermittent charge/discharge.

5 Claims, 3 Drawing Sheets

(52) U.S. Cl.
CPC .......... *H02J 7/0016* (2013.01); *H02J 7/0063* (2013.01); *H02J 7/00712* (2020.01)

(58) Field of Classification Search
CPC .. H02J 7/00306; H02J 7/00302; H02J 7/0013; H02J 7/0016; H01M 10/425; H01M 10/441; H01M 10/46; H01M 10/482; H01M 10/4207; H01M 2010/4271; H01M 2220/10

See application file for complete search history.

(56) References Cited

U.S. PATENT DOCUMENTS

| | | | |
|---|---|---|---|
| 9,625,533 B2 | 4/2017 | Le et al. | |
| 2005/0269995 A1* | 12/2005 | Donnelly | H01M 10/486 320/150 |
| 2013/0175997 A1 | 7/2013 | Hongo et al. | |
| 2016/0336781 A1* | 11/2016 | Hwang | H02J 7/0019 |

FOREIGN PATENT DOCUMENTS

| | | |
|---|---|---|
| JP | 4484858 B2 | 6/2010 |
| JP | 5385719 B2 | 1/2014 |
| JP | 5569643 B2 | 8/2014 |
| JP | 2016-25820 A | 2/2016 |
| JP | 6250884 B2 | 12/2017 |
| JP | 6408531 B2 | 10/2018 |
| JP | 6488995 B2 | 3/2019 |
| KR | 10-2012-0088064 A | 8/2012 |
| KR | 10-2014-0038622 A | 3/2014 |
| KR | 10-2015-0037406 A | 4/2015 |
| KR | 10-2016-0057905 A | 5/2016 |
| KR | 10-2016-0129617 A | 11/2016 |
| KR | 10-2017-0007960 A | 1/2017 |

OTHER PUBLICATIONS

International Search Report for PCT/KR2020/008589 mailed on Sep. 28, 2020.

* cited by examiner

Voltage Model

CELL STABILIZING METHOD AND SYSTEM OF ENERGY STORAGE SYSTEM (ESS)

TECHNICAL FIELD

The present invention relates to a method and a system for stabilizing cells of an energy storage system (ESS), and more specifically, to a method and a system for stabilizing cells of an energy storage system (ESS) capable of maintaining the stability of cells by controlling charge/discharge to minimize the deterioration and impact caused by intermittent charge/discharge, for a plurality of cells included in the energy storage system (ESS).

BACKGROUND ART

As environmental destruction, resource depletion, and the like have been raised as serious problems, there is a growing interest in an energy storage system (ESS) capable of storing energy and efficiently utilizing the stored energy. The energy storage device (ESS) forms a plurality of battery packs by connecting a plurality of battery cells in series or in parallel to maintain a driving voltage and output energy efficiently, and a plurality of battery racks in which a plurality of battery packs are connected in series form a battery.

Meanwhile, typically, as a method for controlling the charge/discharge of a plurality of cells constituting such a battery rack, a method for calculating an average SOC of the plurality of cells included in the battery rack, and performing the charge/discharge of the cells based on the same was used.

However, when charge/discharge is performed based on the average state of charge (SOC) of a plurality of cells included in one battery rack, there is a problem in that there is a variation in the charge/discharge state of the cells.

Specifically, cells with an SOC higher than the average are charged more than necessary, and cells with an SOC lower than the average are discharged more than necessary, and thus, some cells are continuously intermittently charged/discharged at upper/lower limits of Depth of Discharge (DOD), and the phenomenon acts as a main factor to cause the deterioration of cells, thereby causing the deterioration in battery performance.

(Patent Document 1) JP4433752 B2

DISCLOSURE OF THE INVENTION

Technical Solution

The present invention is to enable uniform charge/discharge without the generation of SOC deviation among cells by charging/discharging a plurality of cells included in a battery rack differently by module unit.

Technical Solution

A method for controlling the charge/discharge of a plurality of battery cells constituting each battery module included in an energy storage system (ESS) according to an embodiment of the present invention includes a charge/discharge step of charging/discharging a the plurality of battery cells constituting each battery module, a data measurement step of measuring state of charge (SOC) measurement data of each battery cell at a predetermined interval while the plurality of battery cells are simultaneously charged/discharged by the charge/discharge step, an SOC calculation step of calculating a SOC using the measured SOC measurement data of each battery cell, a maximum/minimum value extraction step of extracting a maximum SOC, which is a largest SOC value for each battery module, and a minimum SOC, which is a smallest SOC value for each battery module for a same time point using the calculated SOC of each battery cell, a charge/discharge operation determination step of determining a charge/discharge operation of the plurality of battery cells included in each battery module, based on the extracted maximum SOC and the extracted minimum SOC, and a charge/discharge operation control step of controlling the charge/discharge operation of the plurality of battery cells included in each battery module, according to the determination result.

Here, the calculating of the SOC in the SOC calculation step is performed by the following Equation (1).

$$\begin{bmatrix} SOC_{d+1} \\ V_{1,d+1} \end{bmatrix} = \begin{bmatrix} 1 & 0 \\ 0 & \exp\left(-\frac{\Delta t}{R_d C_d}\right) \end{bmatrix}$$

$$\begin{bmatrix} SOC_d \\ V_{1,d} \end{bmatrix} + \begin{bmatrix} \frac{\Delta t}{\text{Capacity}} \\ R_d\left(1 - \exp\left(-\frac{\Delta t}{R_d C_d}\right)\right) \end{bmatrix} I_k$$

Equation (1)

($Cd$ : Capacitor, $Rd$ :

Resistance connected in parallel with the capacitor in Voltage Model, $Vd$ : Voltage in $Rd$ and $Cd$ regions in Voltage Model, $\Delta t$ : Time variation, capacity : Capacity, $d = 1.d$ : Interval)

Meanwhile, the charge/discharge operation determination step is characterized by including a first determination step of primarily determining to stop the charge/discharge operation of the plurality of battery cells included in each battery module, when the extracted maximum SOC reaches a maximum limit value UB in a predetermined operation limit range or the extracted minimum SOC reaches a predetermined minimum limit value LB, a deviation calculation step of calculating a difference between the maximum SOC and the minimum SOC of each battery module, when the first determination step primarily determines to stop the charge/discharge operation, and a second determination step of performing final determination on the primary determination in the first determination step, according to a comparison result of comparing whether the calculated difference between the maximum SOC and the minimum SOC exceeds a predetermined reference range.

Specifically, the second determination step finally determines to continue the charge/discharge operation of the plurality of battery cells included in each battery module, even though the maximum SOC reaches the maximum limit value UB or even though the minimum SOC reaches the minimum limit value LB, when the difference between the maximum SOC and the minimum SOC exceeds the predetermined reference range.

Meanwhile, the second determination step finally determines to stop the charge/discharge operation of the plurality of battery cells included in each battery module, when the difference between the maximum SOC and the minimum SOC is within the predetermined reference range.

A system for stabilizing a plurality of battery cells of an energy storage system (ESS) according to another embodiment of the present invention includes a battery rack including one or more battery modules composed of the plurality of battery cells, a charge/discharge control unit for controlling the charge/discharge operation of the plurality of battery cells by the one or more battery modules, a data measurement unit for measuring the SOC measurement data of the plurality of battery cells being charged/discharged at a predetermined interval, an SOC calculation unit for calculating the SOC of each battery cell using the SOC measurement data measured by the data measurement unit, a charge/discharge operation determination unit for determining the charge/discharge operation of the plurality of battery cells by the one or more battery modules, using the SOC of each cell calculated in the SOC calculation unit, and a memory unit for storing reference data for the determination of the charge/discharge operation of the plurality of battery cells for each battery module in the charge/discharge operation determination unit.

Here, the calculating of the SOC of each battery cell in the SOC calculation unit is performed by the following Equation (1).

$$\begin{bmatrix} SOC_{d+1} \\ V_{1,d+1} \end{bmatrix} = \begin{bmatrix} 1 & 0 \\ 0 & \exp\left(-\frac{\Delta t}{R_d C_d}\right) \end{bmatrix}$$

$$\begin{bmatrix} SOC_d \\ V_{1,d} \end{bmatrix} + \begin{bmatrix} \frac{\Delta t}{Capacity} \\ R_d\left(1 - \exp\left(-\frac{\Delta t}{R_d C_d}\right)\right) \end{bmatrix} I_k$$

Equation (1)

($Cd$: Capacitor, $Rd$:

Resistance connected in parallel with the capacitor in Voltage Model, $Vd$: Voltage in $Rd$ and $Cd$ regions in Voltage Model, $\Delta t$: Time variation, capacity: Capacity, $d = 1.d$: Interval)

Meanwhile, the charge/discharge operation determination unit is characterized by including a maximum/minimum value extraction unit for extracting a maximum SOC, which is a largest SOC value for each battery module, and a minimum SOC, which is a smallest SOC value for each battery module for the same time point, among the SOCs of the plurality of battery cells calculated in the SOC calculation unit, and a first determination unit for primarily determining the charge/discharge operation of the plurality of battery cells included in a each battery module by comparing whether the maximum SOC extracted by battery module reaches a maximum limit value UB in a predetermined operation limit range or the minimum SOC extracted by each battery module reaches a minimum limit value LB in a predetermined operation limit range.

Specifically, the first determination unit is characterized by primarily determining to stop the charge/discharge operation of the plurality of battery cells included in a each battery module when either the maximum SOC reaches the maximum limit value UB or the minimum SOC reaches the minimum limit value LB, and then outputting a primary determination signal, and determining to continue the charge/discharge operation of the plurality of battery cells included in each battery module when the maximum SOC is less than the maximum limit value UB and the minimum SOC is greater than the minimum limit value LB, and then outputting a continuation signal.

Meanwhile, the charge/discharge operation determination unit is characterized by including a deviation calculation unit for calculating a difference between the maximum SOC and the minimum SOC of each battery module, when the primary determination signal is output from the first determination unit, and a second determination unit for performing final determination on the primary determination result of stopping the charge/discharge operation of the plurality of battery cells included in each battery module according to a comparison result of comparing whether the calculated difference between the maximum SOC and the minimum SOC exceeds a predetermined reference range.

Specifically, the second determination unit is characterized by finally determining to continue the charge/discharge operation of the plurality of battery cells included in a each battery module when the difference between the maximum SOC and the minimum SOC exceeds a predetermined reference range, and then outputting a continuation signal, and finally determining to stop the charge/discharge operation of the plurality of battery cells included in each battery module, when the difference between the maximum SOC and the minimum SOC is within the predetermined reference range.

Accordingly, the charge/discharge control unit is characterized by controlling such that the plurality of battery cells included in each battery module are continuously charged/discharged when receiving the continuation signal from the second determination unit, and stopping the charge/discharge operation by blocking a charge/discharge current of the plurality of battery cells included in each battery module when receiving the second determination signal.

Advantageous Effects

The present invention is capable of uniformly performing charge/discharge of a plurality of cells without the generation of SOC deviation between cells, so that the deterioration of cells due to the generation of SOC deviation may be prevented, and furthermore, the deterioration in battery performance may be minimized, thereby improving the efficiency of a battery.

MODE FOR CARRYING OUT THE INVENTION

Figure 1:
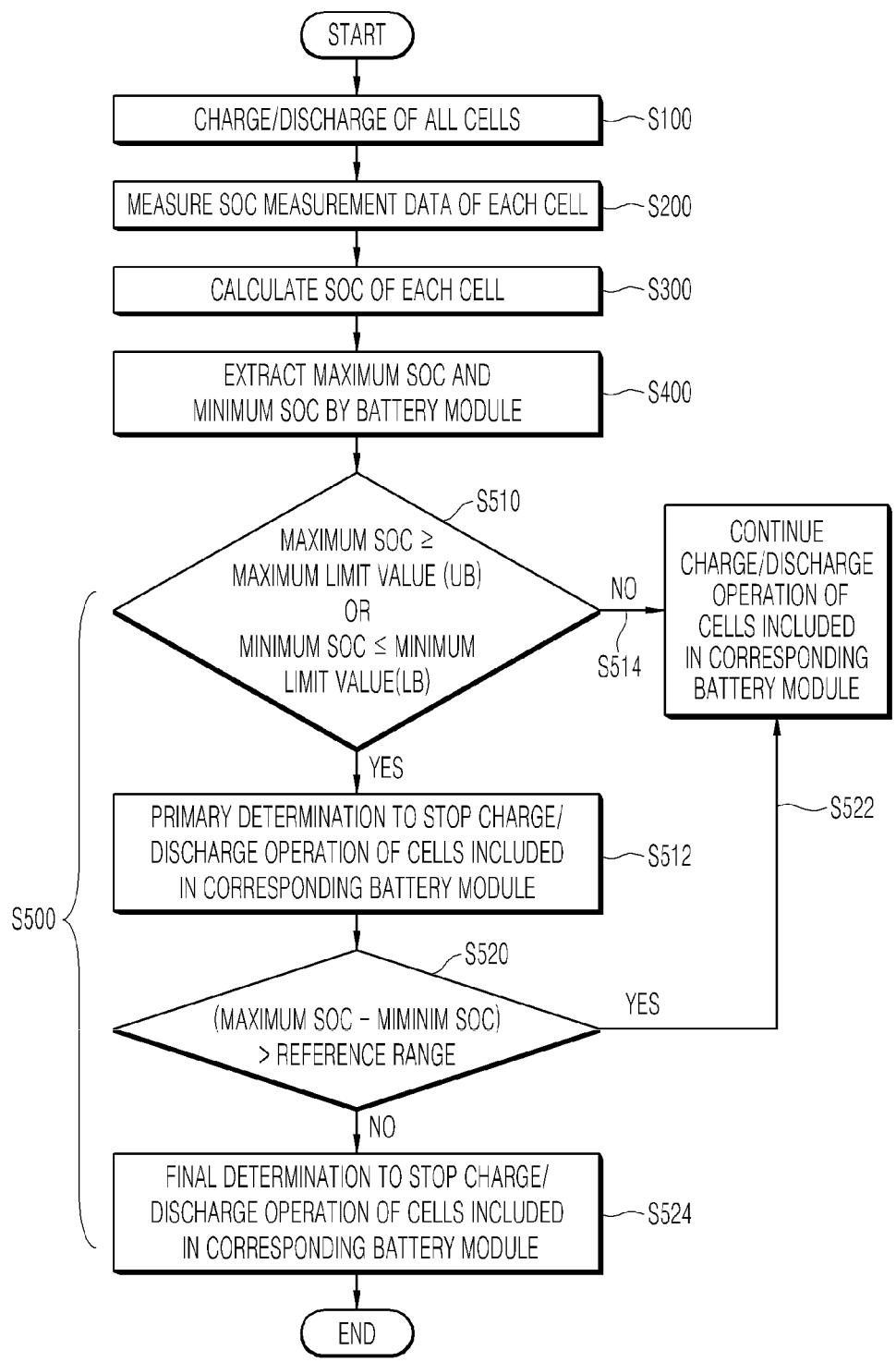
FIG. 1 is a flow chart showing a method for stabilizing cells of an energy storage system (ESS) according to an embodiment of the present invention.

Hereinafter, embodiments of the present invention will be described in detail with reference to the accompanying drawings so that those skilled in the art to which the present invention pertains may easily practice the embodiments. However, the present invention may be embodied in many different forms, and is not limited to the embodiments set forth herein. In addition, in order to clearly describe the present invention, parts irrelevant to the description are omitted in the drawings, and like reference numerals designate like elements throughout the specification.

Hereinafter, the present invention will be described in detail with reference to the accompanying drawings.

Figure 2:
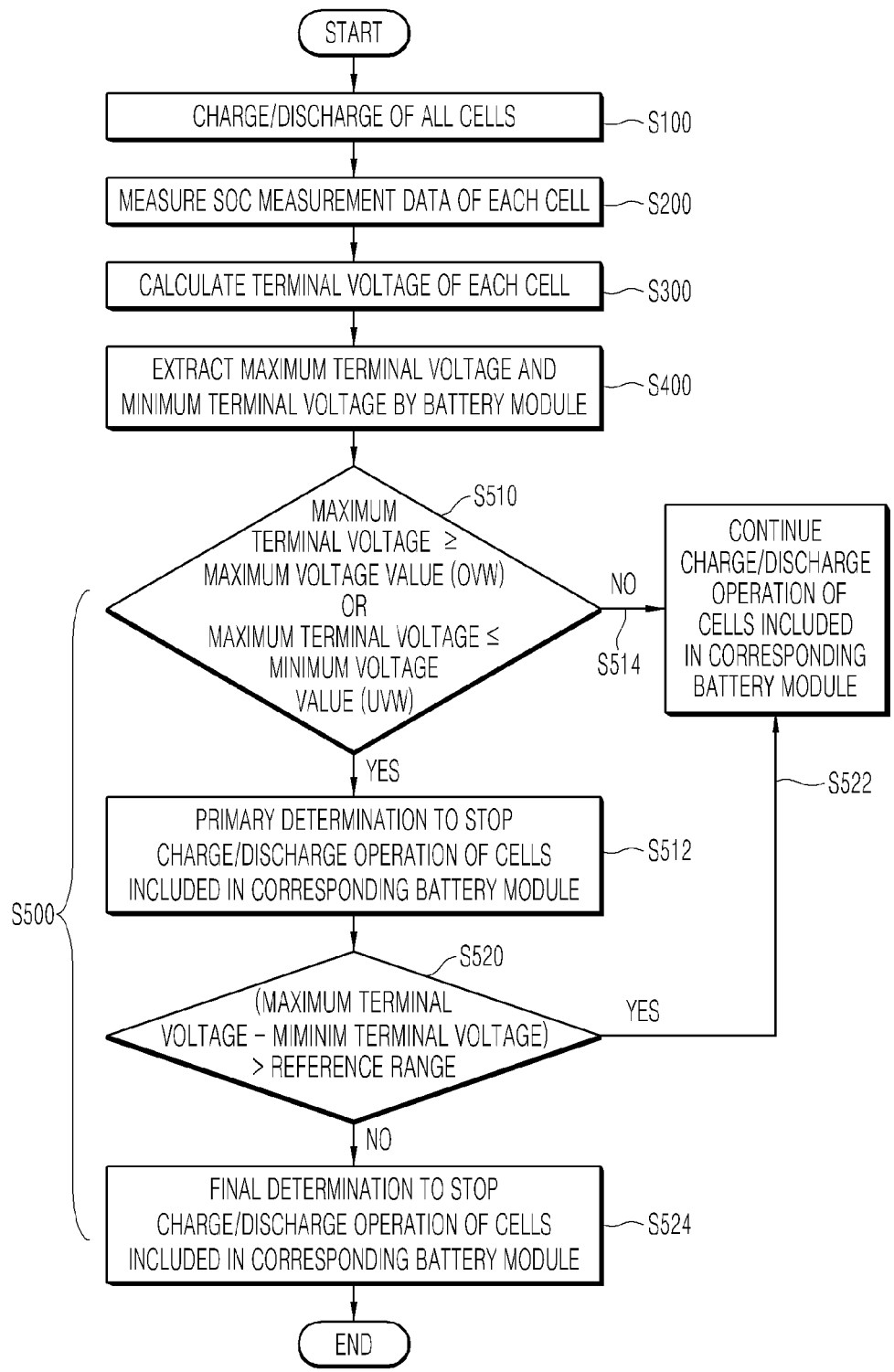
FIG. 2 is a flow chart showing a method for stabilizing cells of an energy storage system (ESS) according another an embodiment of the present invention.

1. Method for Stabilizing Cells of Energy Storage System (ESS) According to the Present Invention FIG. 1 is a flow chart showing an embodiment of the present invention, and FIG. 2 is a flow chart showing another embodiment of the present invention. With reference to the above, the method for stabilizing cells of an energy storage system (ESS) of the present invention will be described.

1.1. Charge/Discharge Step S100

The charge/discharge step is a step of simultaneously performing a charge/discharge operation on a plurality of cells constituting each battery module included in an energy storage system (ESS), and through the step, the plurality of cells constituting the energy storage system (ESS) are charged/discharged. As such, the controlling the charge/discharge of the cells is performed by a charge/discharge control unit 200 to be described later.

1.2. Data Measurement Step S200

The data measurement step is a step of measuring data for the measurement of the SOC of each cell at a predetermined interval while the plurality of cells are simultaneously charged/discharged through the charge/discharge step S100, and is performed by a data measurement unit 300 to be described later.

Specifically, for the plurality of cells being charged/discharged, the current, voltage, and resistance of each cell may be measured at a predetermined interval.

In the present specification, the current, voltage, and resistance values of each cell measured through the step may be referred to as SOC measurement data.

1.3. SOC Calculation Step S300

Example 1: When SOC is Used

The SOC calculation step is a step of calculating the SOC of a corresponding cell based on the measured SOC measurement data of each cell measured in the data measurement step S200, and is performed by an SOC calculation unit 400 to be described later.

Figure 3:
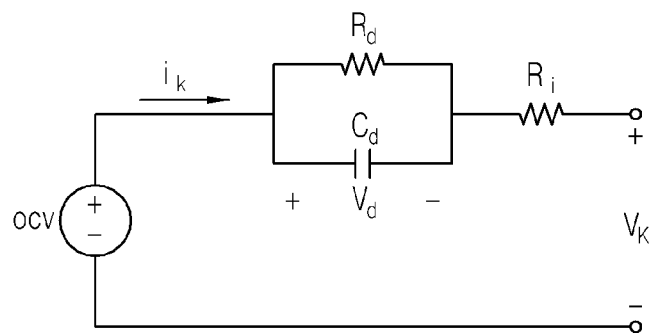
FIG. 3 is a circuit diagram schematically showing a voltage model applied to the present invention.
Figure 4:
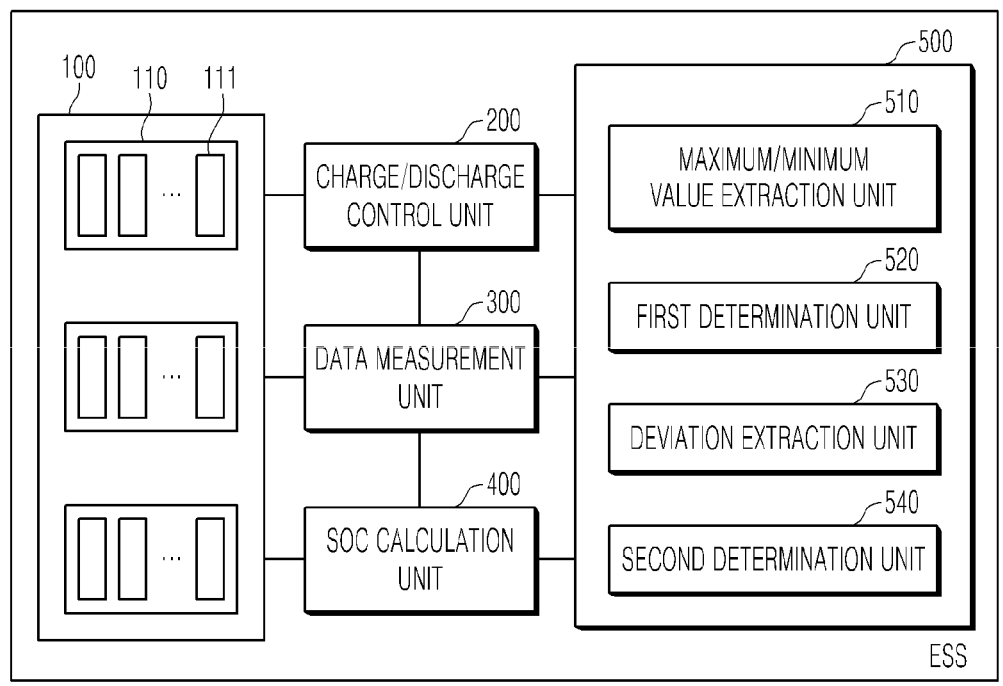
FIG. 4 is a block diagram schematically showing a system for stabilizing cells of an energy storage system (ESS) according to the present invention.

Specifically, the calculating the SOC of a cell may be calculated by the following Equation (1) based on the measured SOC measurement data. (See FIG. 3)

$$\begin{bmatrix} SOC_{d+1} \\ V_{1,d+1} \end{bmatrix} = \begin{bmatrix} 1 & 0 \\ 0 & \exp\left(-\frac{\Delta t}{R_d C_d}\right) \end{bmatrix}$$

$$\begin{bmatrix} SOC_d \\ V_{1,d} \end{bmatrix} + \begin{bmatrix} \frac{\Delta t}{\text{Capacity}} \\ R_d\left(1 - \exp\left(-\frac{\Delta t}{R_d C_d}\right)\right) \end{bmatrix} I_k$$

Equation (1)

($Cd$ : Capacitor, $Rd$ :

Resistance connected in parallel with the capacitor in Voltage Model, $Vd$ : Voltage in $Rd$ and $Cd$ regions in Voltage Model, $\Delta t$ : Time variation, capacity : Capacity, $d = 1.d$ : Interval)

By the above step, the SOC value for each cell being charged/discharged may be obtained.

Example 2: When a Terminal Voltage is Used

In the case of Example 2, instead of the SOC calculation step S300 of calculating the SOC of each cell, it may be configured as a terminal voltage calculation step S300 of calculating a terminal voltage Vk of each cell, and in this case, it is performed by a terminal voltage calculation unit 400 to be described later.

Specifically, the calculating the terminal voltage of a cell may be calculated by the following Equation (2) based on the measured SOC measurement data. (See FIG. 3)

$$Vk = Vd + (Ri \times Ik) + OCV$$

Equation (2):

(Vd: Voltage applied to Rd in a Voltage Model, Ri: Resistance connected in series with Rd, Ik: Current value flowing through Ri, k: Constant)

By the above step, the terminal voltage value for each cell being charged/discharged may be obtained.

1.4. Maximum/Minimum Value Extraction Step S400

Example 1: When SOC is Used

The maximum/minimum value extraction step is a step of extracting a maximum SOC and a minimum SOC for each battery module for the same time point, among the SOCs of each cell calculated through the SOC calculation step S300, and is performed by a maximum/minimum value extraction unit 510 of a charge/discharge operation determination unit 500.

For each battery module, among the SOC values of a plurality of cells included in a corresponding battery module, the SOC value of a cell having the largest SOC may be extracted as the maximum SOC, and the SOC value of a cell having the smallest SOC may be extracted as the minimum SOC. Through the above step, the maximum SOC and the minimum SOC for each battery module are extracted, and the extracted maximum SOC and the extracted minimum SOC may be used to determine whether to stop or continue a charge/discharge operation for the cells included in the corresponding battery module which are being charged/discharged.

Example 2: When a Terminal Voltage is Used

In the maximum/minimum value extraction step according to Example 2, maximum and minimum terminal voltage values for each battery module may be extracted for the same time point, among the terminal voltage value Vk of each cell calculated in the terminal voltage calculation step S300.

For each battery module, among the terminal voltage values of a plurality of cells included in a corresponding battery module, the voltage value of a cell having the largest voltage may be extracted as the maximum terminal voltage, and the terminal voltage value of a cell having the smallest voltage may be extracted as the minimum terminal voltage. Accordingly, the maximum voltage measurement value and the minimum voltage measurement value are extracted for each battery module, and the extracted maximum terminal voltage and minimum terminal voltage may be used to determine whether to stop the charge/discharge of the plurality of cells constituting the corresponding battery module or to continue the same through steps to be described later.

1.5. Charge/Discharge Operation Determination Step S500

Example 1: When SOC is Used

In the charge/discharge operation determination step, in the case of Example 1, the charge/discharge operation of cells included in each battery module may be determined based on the maximum SOC and the minimum SOC for each battery module for the same time point extracted by the maximum/minimum value extraction step S400.

Example 2: When a Terminal Voltage is Used

In the case of Example 2, the charge/discharge operation of cells included in a corresponding battery module may be determined based on the maximum terminal voltage and the minimum terminal voltage for each battery module for the same time point extracted by the maximum/minimum value extraction step S400.

The above charge/discharge operation determination step may include the following detailed steps.

1.5.1. First Determination Step S510

Example 1: When SOC is Used

First, the extracted maximum SOC and minimum SOC may be compared with a maximum limit value UB and a minimum limit value LB of a predetermined operation limit range, respectively, and the charge/discharge operation of the corresponding battery module may be determined according to the comparison result. The above is achieved by a first determination unit 520 to be described later.

Specifically, when a maximum SOC SOCmax reaches (or is equal to or greater than) the maximum limit value UB of the predetermined operation limit range, or a minimum SOC SOCmin reaches (or is equal to or less than) the minimum limit value LB of the predetermined operation limit range, a primary determination S510 may be made to stop the charge/discharge operation of cells included in a corresponding battery module.

That is, when any one of the maximum SOC and the minimum SOC is equal to or greater than the maximum limit value UB or is equal to or less than the minimum limit value LB, the primary determination is made to stop the charge/discharge operation of the cells in the corresponding battery module.

On the other hand, when the maximum SOC is less than the maximum limit value UB and the minimum SOC does not reach the minimum limit value LB, a determination S514 is made to continue the charge/discharge operation of the cells included in the corresponding battery module.

Example 2: When a Terminal Voltage is Used

In the case of Example 2, the extracted maximum terminal voltage and minimum terminal voltage may be compared with a maximum voltage value OVW and a minimum voltage value UVW of a predetermined operation limit range, respectively, and the charge/discharge operation of the corresponding battery module may be determined according to the comparison result.

Specifically, when a maximum terminal voltage Vmax reaches (or is equal to or greater than) the maximum voltage value (Over voltage warming OVW) of the predetermined operation limit range, or a minimum terminal voltage Vmin reaches (or is equal to or less than) the minimum voltage value (Under Voltage Warning UVW) of the predetermined operation limit range, a primary determination may be made to stop the charge/discharge operation of cells included in the corresponding battery module.

That is, when any one of the maximum terminal voltage and the minimum terminal voltage is equal to or less than the maximum voltage value OVW or the minimum voltage value UVW, a determination is made to stop the charge/discharge operation of the cells of the corresponding battery module which are being charged/discharged.

On the other hand, when the maximum terminal voltage is less than the maximum terminal voltage Vmax and the minimum terminal voltage does not reach the minimum terminal voltage Vmin, a determination S514 is made to continue the charge/discharge operation of the cells included in the corresponding battery module.

1.5.2 Deviation Calculation Step

Example 1: When SOC is Used

The deviation calculation step is a step of calculating a difference between the maximum SOC and the minimum SOC of the corresponding battery module for which the primary determination has been made to stop the charge/discharge operation in the first determination step S510, and may be calculated using the maximum SOC and the minimum SOC by battery module which have been extracted in the maximum/minimum value extraction step S400. The deviation between the maximum SOC and the minimum SOC calculated as described above may be used to finally determine the charge/discharge operation of the cells included in the corresponding battery module for which the primary determination has been made to stop the charge/discharge operation in the first determination step S510.

Example 2: When a Terminal Voltage is Used>

Example 2 is to calculate a difference between the maximum terminal voltage and the minimum terminal voltage for each battery module which have been extracted in the maximum/minimum value extraction step S400, and may be performed when a determination has been made to stop the charge/discharge operation in the first determination step S510. Through the above, the deviation between the maximum terminal voltage and the minimum terminal voltage for each battery module is calculated. The deviation between the maximum terminal voltage and the minimum terminal voltage calculated as described above may be used to finally determine the charge/discharge operation of the cells included in the corresponding battery module for which the primary determination has been made to stop the charge/discharge operation in the first determination step S510.

The above operation is performed by a deviation calculation unit 530 to be described later.

1.5.3 Da. Second Determination Step S530

Example 1: When SOC is Used

In the second determination step, using a difference value of the maximum SOC and the minimum SOC calculated through the deviation calculation step S520, the charge/discharge of cells included in a corresponding battery module may be finally determined on the primary determination of the first determination step S510.

Specifically, when the deviation between the maximum SOC and the minimum SOC is compared and when the deviation between the maximum SOC and the minimum SOC exceeds a predetermined reference range, a final determination S522 may be made to continue the charge/discharge operation of the cells included in the corresponding battery module, even when a determination has been made to stop the charge/discharge operation of the cells included in the corresponding battery module in the first determination step S510.

On the other hand, when the deviation between the maximum SOC and the minimum SOC is within the predetermined reference range, a final determination S524 may be made to stop the charge/discharge operation, which is the same as the result of the primary determination made in the first determination step S510 to stop the charge/discharge operation of cells in a corresponding battery module.

In other words, when the maximum SOC and the minimum SOC are compared with the predetermined maximum limit value UB and the predetermined minimum limit value LB to primarily determine the charge/discharge operation of the cells in the corresponding battery module and according to the determination result, when it is determined to stop the charge/discharge operation in the first determination step S510, the deviation between the maximum SOC and the minimum SOC is compared to determine whether to exceed a predetermined reference range in the second determination step S510, and when exceeded, it is finally determined to continue the charge/discharge operation of the cells in the corresponding battery module even when it has been determined to stop the charge/discharge operation in the first determination step S510.

Example 2: When a Terminal Voltage is Used

In the case of Example 2, with a difference value between the maximum terminal voltage and the minimum terminal voltage calculated through the deviation calculation step S520, a final determination may be made on the primary determination result obtained in the first determination step S510 with respect to the charge/discharge operation of the cells included in the corresponding battery module.

Specifically, when the deviation between the maximum terminal voltage and the minimum terminal voltage is compared whether to be included in a predetermined reference range and when the deviation between the maximum terminal voltage and the minimum terminal voltage exceeds the predetermined reference range, a final determination S522 may be made to continue the charge/discharge operation of the cells of the corresponding battery module, even when a determination has been made to stop the charge/discharge operation of the cells included in the corresponding battery module in the first determination step S510.

On the other hand, when the deviation between the maximum terminal voltage and the minimum terminal voltage is within the predetermined reference range, the deviation between SOCs may be within an SOC error range, or power available or power which may be charged is considered to be small, so that the final determination S524 may be made to stop the charge/discharge operation, which is the same as the result of the determination made in the first determination step S510 to stop the charge/discharge operation of the cells in the corresponding battery module.

As such, in the case of Example 2, the maximum terminal voltage and the minimum terminal voltage are compared with the predetermined maximum voltage value OVW and the predetermined minimum voltage value UVW to primarily determine the charge/discharge operation of the cells in the corresponding battery module, and the deviation between the maximum terminal voltage and the minimum terminal voltage is compared to determine whether to exceed the predetermined reference range, and when exceeded, it is finally determined to continue the charge/discharge operation of the cells in the corresponding battery module even when it has been determined to stop the charge/discharge operation in the first determination step S510. On the other hand, On the other hand, when the deviation between the maximum terminal voltage and the minimum terminal voltage is within the predetermined reference range, a final determination may be made to stop the charge/discharge operation of the cells in the corresponding battery module, which is the same as the result of the primary determination.

In summary, Example 1 is to make a primary determination using the maximum SOC and the minimum SOC and to make a final determination on the primary determination using the deviation between the values, and Example 2 is to make a primary determination using the maximum terminal voltage and the minimum terminal voltage and to make a final determination on the primary determination using the deviation between the values.

The above step is performed by a second determination unit 540 to be described later.

Here, there is a different between Example 1 and Example 2 in that an SOC and a terminal voltage are used respectively, so that the predetermined reference range in Example 1 and the predetermined reference range in Example 2 which have been described above are set to be different values.

1.6 Charge/Discharge Operation Control Step

The charge/discharge operation control step is a step of controlling the charge/discharge operation of cells include in a corresponding battery module according to the result of the final determination in the second determination step, and is performed by the charge/discharge control unit 200.

In the second determination step, when it is determined to continue the charge/discharge operation, it is possible to control to continue the charge/discharge by maintaining the state in which a charge/discharge current of the cells of the corresponding battery module flows. On the other hand, in the second determination step, when it is determined to stop the charge/discharge operation, it is possible to stop the charge/discharge operation by blocking the charge/discharge current flowing in the cells of the corresponding battery module.

As such, by controlling a plurality of cells constituting the battery rack 100 to determine by module unit whether to continue the charge/discharge operation of the cells being charged/discharged in two stages according to whether two conditions are satisfied, it is possible to enable uniform charge/discharge by minimizing the deviation between the plurality of cells constituting the battery rack 100m thereby preventing deterioration and adverse effects due to intermittent charge/discharge of cells caused by a charge/discharge state deviation. Accordingly, it is possible to maintain the stability of cells, and furthermore, to operate the energy storage system (ESS) more stably.

2. System for Stabilizing Cells of Energy Storage System (ESS) According to the Present Invention 2.1. Battery Rack 100

The battery rack includes one or more battery modules 110, and each battery module 110 may include a plurality of battery cells 111.

Each battery module 110 constituting the battery rack is assigned a corresponding module identification number, and each battery cell 111 included in the battery module is also assigned a corresponding cell identification number.

2.2. Charge/Discharge Control Unit 200

The above is a component for controlling the charge/discharge operation of cells included in each battery module 110, and according to the determination of a charge/discharge operation determining unit 400 to be described later, may block a charge/discharge current of a cell being charged/discharged to stop a charge/discharge operation, or may maintain the charge/discharge.

The charge/discharge control unit may control the charge/discharge operation of cells in a corresponding battery module according to a control signal output from a charge/discharge operation determination unit 400 to be described later.

2.3. Data Measurement Unit 300

The data measuring unit may measure the current, voltage, and resistance values of each cell 100 at a predetermined interval in the state in which a plurality of cells 111 included in each battery module 110 constituting the battery rack 100 are being charged/discharged.

The data measurement unit includes a current measurement unit, a voltage measurement unit, and a resistance measurement unit (hereinafter, not shown) to measure the current, voltage, and resistance values of each cell being charged/discharged at predetermined interval.

The current and voltage values of each cell measured as described above are referred to as SOC measurement data.

2.4. SOC Calculation Unit 400

Example 1: When SOC is Used

The SOC calculation unit may calculate the SOC of a corresponding cell by the following Equation (1) based on the SOC measurement data of each cell being charged/discharged measured by the data measurement unit 300. (See FIG. 3)

$$\begin{bmatrix} SOC_{d+1} \\ V_{1,d+1} \end{bmatrix} = \begin{bmatrix} 1 & 0 \\ 0 & \exp\left(-\frac{\Delta t}{R_d C_d}\right) \end{bmatrix} \begin{bmatrix} SOC_d \\ V_{1,d} \end{bmatrix} + \begin{bmatrix} \frac{\Delta t}{\text{Capacity}} \\ R_d\left(1 - \exp\left(-\frac{\Delta t}{R_d C_d}\right)\right) \end{bmatrix} I_k \quad \text{Equation (1)}$$

($Cd$ : Capacitor, $Rd$ :

Resistance connected in parallel with the capacitor in Voltage Model, $Vd$ : Voltage in $Rd$ and $Cd$ regions in Voltage Model, $\Delta t$ : Time variation, capacity : Capacity, $d = 1.d$ : Interval)

Through the above, the SOC value for each cell being charged/discharged may be obtained.

Example 2: When a Terminal Voltage is Used

Example 2 is composed of a terminal voltage calculation unit 400 instead of the above-described SOC calculation unit, which may be used to determine charge/discharge by calculating the terminal voltage $Vk$ of each cell.

The calculating of the terminal voltage $Vk$ of each cell may be performed by the following Equation (2) based on the SOC measurement data of each cell being charged/discharged measured by the data measurement unit 300. (See FIG. 3)

$$Vk = Vd + (Ri \times Ik) + OCV \quad \text{Equation (2):}$$

($Vd$: Voltage in $Rd$ and $Cd$ regions in Voltage Model, $Ri$: Resistance connected in series with $Rd$, $Ik$: Current value flowing through $Ri$, $k$: Constant)

Through the above, the terminal voltage value for each cell being charged/discharged may be obtained.

2.5. Charge/Discharge Operation Determination Unit 500

Example 1: When SOC is Used

The charge/discharge operation determination unit may determine the charge/discharge operation of corresponding cells for each battery module using the SOC of each cell calculated in the SOC calculation unit 400.

Example 2: When a Terminal Voltage is Used

The charge/discharge operation determination unit according to Example 2 may determine the charge/discharge operation of corresponding cells for each battery module using the terminal voltage of each cell being charged/discharged calculated in the terminal voltage calculation unit 400.

The above charge/discharge operation determination unit may include the following detailed components.

2.5.1 Maximum/Minimum Value Extraction Unit 510

Example 1: When SOC is Used

The maximum/minimum value extraction unit is a component for extracting a maximum SOC and a minimum SOC for each battery module for the same time point, among the SOCs of each cell calculated in the SOC calculation unit 400.

For each battery module, among the SOC values of a plurality of cells included in a corresponding battery module, the SOC value of a cell having the largest SOC may be extracted as the maximum SOC SOCmax, and the SOC value of a cell having the smallest SOC may be extracted as the minimum SOC SOCmin. Through the above, the maximum SOC and the minimum SOC for each battery module are extracted, and the extracted maximum SOC and the extracted minimum SOC may be used to determine whether to stop or continue the charge/discharge operation of cells included in the corresponding battery module.

Example 2: When a Terminal Voltage is Used

The maximum/minimum value extraction unit according to Example 2 may extract the maximum terminal voltage and the minimum terminal voltage for each battery module for the same time point, among the terminal voltages of each cell calculated in the terminal voltage calculation unit 400.

For each battery module, among the terminal voltage values of a plurality of cells included in a corresponding battery module, the terminal voltage value of a cell having the largest terminal voltage may be extracted as the maximum terminal voltage Vmax, and the terminal voltage value of a cell having the smallest terminal voltage may be extracted as the minimum terminal voltage Vmin. Through the above, the maximum terminal voltage and the minimum terminal voltage for each battery module are extracted, and the extracted maximum terminal voltage and the extracted minimum terminal voltage may be used to determine whether to stop or continue the charge/discharge operation of cells included in the corresponding battery module.

2.5.2 First Determination Unit 520

Example 1: When SOC is Used

The first determination unit according to Example 1 may determine whether to stop or continue the charge/discharge operation of cells included in a corresponding battery module using the maximum SOC and the minimum SOC for each battery module which have been extracted in the maximum/minimum value extraction unit 510.

Specifically, the extracted maximum SOC and minimum SOC for each battery module may be compared with the maximum limit value UB and the minimum limit value LB of a predetermined operation limit range, respectively, and a determination may be made according to the comparison result.

According to the comparison result, when either the maximum SOC reaches the maximum limit value UB or the minimum SOC reaches the minimum limit value LB, a primary determination is made to stop the ongoing charge/discharge operation of cells included in the corresponding battery module and then a first determination signal may be generated and output.

On the other hand, when the maximum SOC is less than the maximum limit value UB and the minimum SOC is greater than the minimum limit value LB, a determination is made to continue the ongoing charge/discharge operation of the cells included in the corresponding battery module and then a continuation signal may be generated and output.

Example 2: When a Terminal Voltage is Used

The first determination unit according to Example 2 may determine whether to stop or continue the charge/discharge operation of cells included in a corresponding battery module using the maximum terminal voltage and the minimum terminal voltage for each battery module which have been extracted in the maximum/minimum value extraction unit 510.

Specifically, the extracted maximum terminal voltage and minimum terminal voltage for each battery module may be compared with the maximum voltage value OVW and the minimum voltage value UVW of a predetermined operation limit range, respectively, and a determination may be made according to the comparison result.

According to the comparison result, when either the maximum terminal voltage reaches the maximum voltage value OVW or the minimum terminal voltage reaches the minimum voltage value UVW, a primary determination is made to stop the ongoing charge/discharge operation of cells included in the corresponding battery module and then a primary determination signal representing the same may be generated and output.

On the other hand, when the maximum terminal voltage is less than the maximum voltage value OVW and the minimum terminal voltage is greater than the minimum voltage value UVW, a determination is made to continue the ongoing charge/discharge operation of the cells included in the corresponding battery module and then the continuation signal representing the same may be generated and output.

Here, at this time, the first determination signal and the continuation signal include a module identification number of a corresponding battery module and cell identification numbers of cells included therein.

2.5.3 Deviation Calculation Unit 530

Example 1: When SOC is Used

The deviation calculation unit may be a component for calculating, using the maximum SOC and the minimum SOC for each battery module which have been extracted in the maximum/minimum value extraction unit 410, the difference between the maximum SOC and the minimum SOC.

Specifically. the deviation calculation unit operates when a first determination signal indicating a result of determining to stop a charge/discharge operation is output from the first determination unit 520, and may calculate the deviation between the maximum SOC and the minimum SOC of a corresponding battery module using a module identification number and a cell identification number included in the output first determination signal.

Example 2: When a Terminal Voltage is Used

The deviation calculation unit may calculate, using the maximum terminal voltage and the minimum terminal voltage for each battery module which have been extracted in the maximum/minimum value extraction unit 510, the difference between the maximum terminal voltage and the minimum terminal voltage.

Specifically, the deviation calculation unit operates when a first determination signal indicating a result of determining to stop a charge/discharge operation is output from the first determination unit 520, and may calculate the deviation between the maximum terminal voltage and the minimum voltage of a corresponding battery module using a module identification number and a cell identification number included in the output first determination signal.

2.5.4 Second Determination Unit 540

Example 1: When SOC is Used

The second determination unit may use the deviation between the maximum SOC and the minimum SOC of a corresponding battery module, which corresponds to the first determination signal calculated in the deviation calculation unit 530, to finally determine on the primary determination result of stopping the charge/discharge of cells included in the corresponding battery module.

Specifically, by comparing whether the deviation between the maximum SOC and the minimum SOC calculated in the deviation calculation unit 530 exceeds a predetermined reference range, a final determination may be made on the primary determination according to the comparison result.

According to the comparison result, when the calculated deviation between the maximum SOC and minimum SOC exceeds the predetermined reference range, a final determination is made to continue the charge/discharge operation of the cells included in the corresponding battery module, and a continuation signal is output to the charge/discharge control unit 200 to continue the ongoing charge/discharge operation.

On the other hand, when the calculated deviation between the maximum SOC and the minimum SOC is within the predetermined reference range, power available or power which may be charged is considered to be small, so that a final determination may be made to stop the charge/discharge operation of the cells included in the corresponding battery module, which is the same as the primary determination made in the first determination unit 510, and a second determination signal is output to the charge/discharge control unit 200 to stop the charge/discharge operation of the cells in the corresponding battery module.

In summary, even though the maximum SOC of a battery module reaches the maximum limit value UB or the minimum SOC thereof reaches the minimum limit value LB, when the difference between the maximum SOC and the minimum SOC exceeds a predetermined reference range, a final determination is made to continue the charge/discharge operation of cells included in a corresponding battery module, and when either the maximum SOC of the battery module reaches the maximum limit value UB or the minimum SOC reaches the minimum limit value LB and when the difference between the maximum SOC and the minimum SOC is within the predetermined reference range, a final determination is made to stop the charge/discharge operation of the cells included in the corresponding battery module.

Example 2: When a Terminal Voltage is Used

The second determination unit according to Example 2 may use the deviation between the maximum terminal voltage and the minimum terminal voltage of a corresponding battery module, which corresponds to the first determination signal calculated in the deviation calculation unit 530, to finally determine on the primary determination result of stopping the charge/discharge of cells included in the corresponding battery module.

Specifically, by comparing whether the deviation between the maximum terminal voltage and the minimum terminal voltage calculated in the deviation calculation unit 530 exceeds a predetermined reference range, a final determination may be made on the primary determination according to the comparison result.

According to the comparison result, when the calculated deviation between the maximum terminal voltage and the minimum terminal voltage exceeds the predetermined reference range, a final determination is made to continue the charge/discharge operation of the cells included in the corresponding battery module, and a continuation signal is output to the charge/discharge control unit 200 to continue the ongoing charge/discharge operation.

On the other hand, when the calculated deviation between the maximum terminal voltage and the minimum terminal voltage is within the predetermined reference range, a final determination may be made to stop the charge/discharge operation of the cells included in the corresponding battery module, which is the same as the primary determination made in the first determination unit 510, and a second determination signal is output to the charge/discharge control unit 200 to stop the ongoing charge/discharge operation of the cells in the corresponding battery module.

In summary, even though the maximum terminal voltage of a battery module reaches the maximum voltage value OVW or the minimum terminal voltage thereof reaches the minimum voltage value UVW, when the difference between the maximum terminal voltage and the minimum voltage exceeds a predetermined reference range, a final determination is made to continue the charge/discharge operation of cells included in a corresponding battery module, and when either the maximum terminal voltage of the battery module reaches the maximum voltage value OVW or the minimum terminal voltage reaches the minimum voltage value UVW and when the difference between the maximum terminal voltage and the minimum terminal voltage is within the predetermined reference range, a final determination is made to stop the charge/discharge operation of the cells included in the corresponding battery module.

Here, since the second determination signal also includes a module identification number of a corresponding battery module and a cell identification number of a cell included therein, the charge/discharge control unit 200 which receives the same identifies the corresponding battery modules of various battery modules and blocks a charge/discharge current of the cells included therein to stop the charge/discharge operation.

In addition, there is a different between the above-described Example 1 and Example 2 in that an SOC and a terminal voltage are used respectively, so that the predetermined reference range in Example 1 and the predetermined reference range in Example 2 are set to be different values.

2.6. Memory Unit 600

In the memory unit, the maximum limit value UB and the minimum limit value LB of a predetermined operation limit range which are references for determining the charge/discharge operation of cells in the first determination unit 520 and the second determination unit 540, and values such as a predetermined reference range are stored.

Meanwhile, although the technical spirit of the present invention has been described in detail according to the above embodiment, it should be noted that the above embodiment is for the description thereof, and is not intended to limit the same. In addition, those skilled in the art will understand that various embodiments are possible within the scope of the technical spirit of the present invention.

DESCRIPTION OF SYMBOLS

100: Battery rack
110: Battery module
111: Battery cell
200: Charge/discharge control unit
300: Data measurement unit
400: SOC calculation unit
500: Charge/discharge operation determination unit
510: Maximum/minimum value extraction unit
520: First determination unit
530: Deviation calculation unit
540: Second determination unit
600: Memory unit

What is claimed is:

1. A method for controlling charge/discharge of a plurality of battery cells constituting each battery module included in an energy storage system (ESS), the method comprising:
   a charge/discharge step of charging/discharging the plurality of battery cells constituting each battery module;
   a data measurement step of measuring state of charge (SOC) measurement data of each battery cell at a predetermined interval while the plurality of battery cells are simultaneously charged/discharged by the charge/discharge step;
   an SOC calculation step of calculating a SOC using the measured SOC measurement data of each battery cell;
   a maximum/minimum value extraction step of extracting a maximum SOC, which is a largest SOC value for each battery module, and a minimum SOC, which is a smallest SOC value for each battery module, for a same time point using the calculated SOC of each battery cell;
   a charge/discharge operation determination step of determining a charge/discharge operation of the plurality of battery cells included in each battery module, based on the extracted maximum SOC and the extracted minimum SOC; and
   a charge/discharge operation control step of controlling the charge/discharge operation of the plurality of battery cells included in each battery module, according to the determination result,
   wherein the charge/discharge operation determination step comprises:
   a first determination step of a first determining to stop the charge/discharge operation of the plurality of battery cells included in each battery module, when the extracted maximum SOC reaches a maximum limit value in a predetermined operation limit range or the extracted minimum SOC reaches a predetermined minimum limit value in the predetermined operation limit range, and if the first determination step determines to stop the charge/discharge operation, performing a second determination step of performing a second determination based on the first determination, according to a comparison result of comparing whether a calculated difference between the maximum SOC and the minimum SOC exceeds a predetermined reference range, the second determination being the determination result.

2. The method of claim 1, wherein the calculating of the SOC in the SOC calculation step is performed by the following Equation (1):

$$\begin{bmatrix} SOC_{d+1} \\ V_{1,d+1} \end{bmatrix} = \begin{bmatrix} 1 & 0 \\ 0 & \exp\left(-\frac{\Delta t}{R_d C_d}\right) \end{bmatrix}$$
$$\begin{bmatrix} SOC_d \\ V_{1,d} \end{bmatrix} + \begin{bmatrix} \frac{\Delta t}{Capacity} \\ R_d\left(1 - \exp\left(-\frac{\Delta t}{R_d C_d}\right)\right) \end{bmatrix} I_k$$

Equation (1)

Cd: Capacitor, Rd: Resistance connected in parallel with the capacitor in Voltage Model, V1,d: Voltage in Rd and Cd regions in Voltage Model during an interval, V1,d+1: calculated voltage, Δt: Time variation, capacity: Capacity of capacitor, d=1.d: Interval, Ik: Current value flowing through a resistor.

3. The method of claim 1, wherein the charge/discharge operation determination step further comprises:

a deviation calculation step of calculating the difference between the maximum SOC and the minimum SOC of each battery module, when the first determination step determines to stop the charge/discharge operation.

4. The method of claim 3, wherein the second determination step determines to continue the charge/discharge operation of the plurality of battery cells included in each battery module, even though the maximum SOC reaches the maximum limit value or even though the minimum SOC reaches the minimum limit value, when the difference between the maximum SOC and the minimum SOC exceeds the predetermined reference range.

5. The method of claim 3, wherein the second determination step determines to stop the charge/discharge operation of the plurality of battery cells included in each battery module, when the difference between the maximum SOC and the minimum SOC is within the predetermined reference range.

* * * * *